Patented July 21, 1942

2,290,393

UNITED STATES PATENT OFFICE 2,290,393

METHOD OF PREPARING A WAX-ISO-BUTYLENE POLYMER COATING COMPOSITION

Gordon C. Thomas, Old Greenwich, Conn., assignor to The Lummus Company, New York, N. Y., a corporation of Delaware No Drawing. Application June 10, 1939,
Serial No. 278,478

2 Claims. (Cl. 260—28)

This invention relates to a method of preparing coating compositions for use on sheet material such as paper, regenerated films, leather, etc., to impart thereto variously the properties of imperviousness to moisture, vapor, and grease, flexibility, hardness, transparency, high tensile strength, high bonding strength, and freedom from blocking.

A principal object of the invention is to provide an improved method of forming a novel coating composition for sheet materials which may be used in conjunction with conventional coating machines without change of construction or technique, and which will give the desired improved qualities of moisture-vapor-proofness, strength, flexibility, etc.

Another and more specific object of the present invention is the production of highly moisture-vapor proof, flexible, and high bonding strength paper sheets for use in wrapping and packaging food products, particularly frozen foods which are subjected to a low degree of cold.

The prior art is replete with various wax and cellulose mixtures suggested for use in coating sheet material. However, these prior compositions are objectionable for the reason that the coated paper produces cracks when bent or folded, as when packaging articles, and soon loses its resistance to moisture-vapor penetration and the like. Furthermore, when used for wrapping or packaging frozen foods in which temperatures as low as —20° or —30° F. are employed, the coated sheets of the prior art become loosened at the points where the sheets have been lapped and sealed by heat.

Sheets prepared in accordance with the present invention and utilizing a coating composition as hereinafter described, avoid these shortcomings of the prior art and have all of the desirable characteristics before enumerated.

The instant coating composition is usually compounded by adding a relatively small amount of a polymer of butylene to a scale wax, derived from any desired source. Excellent results may also be obtained by using higher melting point paraffins, vegetable waxes such as carnauba, or other mineral waxes such as petrolatums and the various earth-waxes such as ceresin, montan, ozocerite, and the like. Various polymers of butylene are known, ranging in consistency from that of a viscous oil to high molecular weight rubbery materials. Preferably only those polymers having a molecular weight ranging from 50,000 to 100,000 will be used in preparing this coating composition, although it is also possible to use polymers having a molecular weight somewhat below 50,000 or somewhat above 100,000. I have found that the polymer of molecular weight of about 65,000 is particularly well suited as the addition agent to the waxeous material.

A suitable addition agent for use in my coating composition is the substance available on the market under the trade-mark "Vistanex", said substance being a true hydrocarbon and a non-hardenable polymer of butylene. A definition of "Vistanex" may be found in an article entitled "Chemical trends in the petroleum industry," by Per K. Frolich, appearing in "Industrial Engineering and Chemistry," vol. 30, No. 8, 1938, beginning on page 916.

It is defined as a polymerization product of unsaturated gaseous hydrocarbons with metallic halides giving a substantially linear polymer and in the range above 50,000 is rubbery and substantially solid plastic and elastic material.

Attention is directed to my copending application, S. N. 265,511, filed April 1, 1939, wherein I have disclosed and claimed a method of producing a novel coating material in which wax is liquefied and blended with a polymerization product of butadiene, known as "Buna."

In carrying out the method of producing this novel coating material, a suitable wax either paraffinic or one of the other waxes heretofore mentioned, is liquefied by any suitable means, the desired quantity of butylene polymer is dissolved in a hydrocarbon solvent such as gasoline or benzine or low boiling naphtha, and thereafter the liquefied wax and the butylene polymer solution are intimately mixed while in an attenuated stream.

Preferably, although not necessarily, this mixing operation may be expeditiously carried out in an homogenizer of the type generally described in Cornell's U. S. Patent 2,042,880, issued June 2, 1936. Such apparatus produces a complete dispersion of the butylene polymer in the wax. Simultaneously with the bringing together of the two liquids, a vacuum is applied sufficient to remove the solvent, and, if desired, a condensable inert vapor, such as steam, may be introduced into the homogenizer to facilitate the removal of the solvent vapors therefrom. When desirable, the mixing or homogenizing may also take place in the presence of heat to accelerate the solvent removal or maintain the fluidity of the materials. When necessary, removal of the solvent may take place in several stages, so that a solvent-free product is obtained.

The end product has approximately the same melting point as the wax stock used, and from an examination thereof it appears that the dispersion of the butylene polymer in the wax breaks down the normal crystalline formation of the wax molecules into the amorphous form.

I have found that the most successful proportions of butylene polymer which may be incorporated in the wax vary from 1 to 20% and are preferably limited to the range of 5 to 15%. For coating of paper I have found that scale wax having a melting point of approximately 127° F. and refined paraffin having a melting point of 140° F are most satisfactory.

The scale wax, due to the slight amount of oil present, appears to blend with the butylene polymer and form a more complete solution. The coated paper is very flexible and quite satisfactory.

With the paraffin of 140° melting point a somewhat harder surface is obtained and the coating is non-blocking in the paper rolls. Higher percentages of butylene polymer tend to increase the flexibility of the coating and tend to increase the viscosity of the coating material.

The blending of the butylene polymer in a waxeous material appears to be most satisfactorily carried out in the homogenizer, not only because of the very intimate mix possible, but also due to the film formation, it is possible to remove the solvent without destroying the intimate blend. It is considerably more difficult to obtain such conditions on other forms of machines, and I have been unable to merely mix or knead the butylene polymer into a waxeous material as such procedure does not produce a homogeneous permanent dispersion. The resultant blended material can, of course, be coated on a base material by the usual coating processes as are generally practiced.

The coating is applicable to various types of sheet material to render them either more flexible, strong, or moisture-vapor-proof, or for the purpose of filler. I find that paper coated with this composition is remarkably flexible and strong, and may be very easily sealed by the suitable application of heat to the folded ends. A very strong bond is initially formed and this bond persists irrespective of temperature conditions and is particularly satisfactory at the very low temperatures common with frozen foods.

A paper coating of the blended butylene polymer and paraffin wax also has a very high moisture-vapor-proof quality. On comparative tests it is substantially better than Cellophane and is nearly as satisfactory as metal films. It is possible to obtain a moisture-vapor-proof quality of moisture-vapor transfer of one gram or less per square meter for twenty-four hours.

Blending of the butylene polymer with the wax in the homogenizer, as described, also has the advantage that the resultant composition can be reheated without destroying the intimate dispersion of the butylene polymer in the wax. The flexibility of the coating under extreme temperature conditions is probably due not only to the stability of the butylene polymer (which is practically completely saturated) incorporated therein, but also to the fact that the butylene polymer has a definite rubbery characteristic, not only as to feel, but as to elasticity also.

Although butylene polymers appear to be the most satisfactory addition agent and paraffin wax the most satisfactory body material, I have also successfully blended vinyl-acetate in paraffin wax using methyl ethyl ketone as the solvent and such product can also be most effectively blended on the homogenizer, which forms the necessary intimate dispersion.

While I have described a preferred form of embodiment of my invention, I am aware that modifications may be made thereto and I, therefore, desire a broad interpretation of my invention within the scope and spirit of the description herein and of the claims appended hereinafter.

What I claim is:

1. The method of preparing a flexible, moisture-vapor-proof, non-cracking coating composition for use with cellulosic sheets which consists in dispersing a polymerization product of isobutylene and of a molecular weight of at least 50,000 in a wax while both materials are maintained in a fluid state, said dispersion being carried out in an attenuated stream subjected to a substantial centrifugal force whereby a homogeneous mixture is formed which will not separate into its constituents on continued melting and congealing.

2. The method of preparing coating material for use with cellulosic sheets which consists in homogenizing a liquified paraffin wax in the melting point range of 127° to 140° F. and an artificial rubbery polymer of isobutylene and of a molecular weight of at least 50,000 suspended in a low boiling hydrocarbon solvent, the said homogenizing being carried out in an attenuated stream subjected to a substantial centrifugal force whereby a homogeneous mixture is formed which will not separate into its constituents on continued melting and congealing and taking place in the presence of heat and vacuum sufficient to continuously vaporize the solvent.

GORDON C. THOMAS.